US009367466B2

(12) United States Patent
Poremba et al.

(10) Patent No.: US 9,367,466 B2
(45) Date of Patent: Jun. 14, 2016

(54) CONDITIONAL PREFETCHING

(71) Applicant: Advanced Micro Devices, Inc., Sunnyvale, CA (US)

(72) Inventors: Matthew R. Poremba, Shavertown, PA (US); Gabriel H. Loh, Bellevue, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 145 days.

(21) Appl. No.: 13/765,813

(22) Filed: Feb. 13, 2013

(65) Prior Publication Data

US 2014/0229682 A1  Aug. 14, 2014

(51) Int. Cl.
  *G06F 9/38* (2006.01)
  *G06F 12/08* (2016.01)

(52) U.S. Cl.
  CPC .... *G06F 12/0862* (2013.01); *G06F 2212/6026* (2013.01)

(58) Field of Classification Search
  None
  See application file for complete search history.

(56) References Cited

U.S. PATENT DOCUMENTS

| | | | |
|---|---|---|---|
| 6,721,870 B1 * | 4/2004 | Yochai et al. | 711/204 |
| 8,667,224 B1 * | 3/2014 | Yu et al. | 711/137 |
| 2013/0339625 A1 * | 12/2013 | Prasky et al. | 711/137 |

OTHER PUBLICATIONS

Chen, Yong et al.; Data Access History Cache and Associated Data Prefetching Mechanisms; 2007 Association for Computing Machinery; Nov. 2007.
Nesbit, Kyle J. et al.; Data Cache Prefetching Using a Global History Buffer; University of Wisconsin—Madison; Feb. 2004.
Cucchiara, Rita et al.; Temporal Analysis of Cache Prefetching Strategies for Multimedia Applications; Apr. 2001.

* cited by examiner

*Primary Examiner* — Adam M Queler
*Assistant Examiner* — Jason Blust
(74) *Attorney, Agent, or Firm* — Faegre Baker Daniels LLP

(57) ABSTRACT

A type of conditional probability fetcher prefetches data, such as for a cache, from another memory by maintaining information relating to memory elements in a group of memory elements fetched from the second memory. The information may be an aggregate number of memory elements that have been fetched for different memory segments in the group. The information is maintained responsive to fetching one or more memory elements from a segment of memory elements in the group of memory elements. Prefetching one or more remaining memory elements in a particular segment of memory elements from the second memory into the first memory occurs when the information relating to the memory elements in the group of memory elements indicates that a prefetching condition has been satisfied.

30 Claims, 5 Drawing Sheets

CONDITIONAL PREFETCHING

FIELD OF THE DISCLOSURE

The present disclosure is related to prefetching data for a first memory from a second memory.

BACKGROUND OF THE DISCLOSURE

In computing, faster memory (cache) is more expensive than slower memory (such as RAM). Accordingly, for bulk storage, slower memory is often employed. When data is needed/used by a processor, faster response is achieved if the data can be obtained from the cache (a cache "hit") rather than the slower memory. Cache is logically placed between a processor(s) and the slower memory. Some systems employ multiple layers of caches that become increasingly fast according to their logical placement relative to the processor. Accordingly, the cache is queried for required data. If the cache does not have the required data (a cache "miss"), the cache obtains it from the slower memory (which likewise obtains it from slower memory if not already present). The data is then kept in the cache for so long as the faster memory has room for it. When the cache is full, data must be removed therefrom to allow additional data to be stored therein. Accordingly, various algorithms exist to determine what data is pushed out of the cache (replacement policies).

One such algorithm is the least recently used (LRU) algorithm. The above construct provides that subsequent calls for data that are already present in the cache (cache hit) can quickly serve the data, thereby speeding up the process. Each memory element of memory that can be transferred to the cache is called a cache line. Cache hits often result in the desired data being provided to a processor in a few cycles. Cache misses, however, often require many more cycles to get the requested data to the processor. Caches can be used for both reads and writes by the processor.

Accordingly, the above process only provides such speed advantages when the data is located in the cache. In the above example, this occurs on second and subsequent calls for the data. The speed advantages are not present for the first time that data is called. To alleviate this problem, prefetch algorithms have been developed that attempt to predict what data (e.g., instructions or data) will be needed and place that data in the cache before it is called for (predictive algorithms). As previously noted, including one piece of data in the cache usually requires expulsion of another piece of data. Thus, it is not feasible to put all data in the cache. Furthermore, predictive systems typically require additional hardware to compute the predictive algorithms. Accordingly, the time saved by successful prediction must be great enough to overcome the time and hardware invested in generating the prediction. Existing prefetching solutions generally use large tables to identify known addresses used in the past and to provide complex rules that dictate prefetching based on a multitude of variables.

For example, stride prefetchers and Markov prefetchers generally use large tables to identify the known addresses and such techniques do not generally capture the overall spatial locality of workloads being carried out by the one or more processors and can potentially be very conservative. For example, stride prefetching algorithms are known which determine if a cache miss occurs and predicts that an address that is offset by a distance from the missed address is likely to be missed in the near future. As such, when an address miss occurs, an address is prefetched that is offset by a distance from the missed address. Also if desired, when there is a hit in the buffer, a prefetch of the address that is offset by a distance from the hit address can also be obtained. These prefetchers typically use large tables and may incur additional hardware and/or power overheads.

Accordingly, there exists a need for a device and method that provide an improved predictive caching technique.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE EMBODIMENTS

Figure 1:
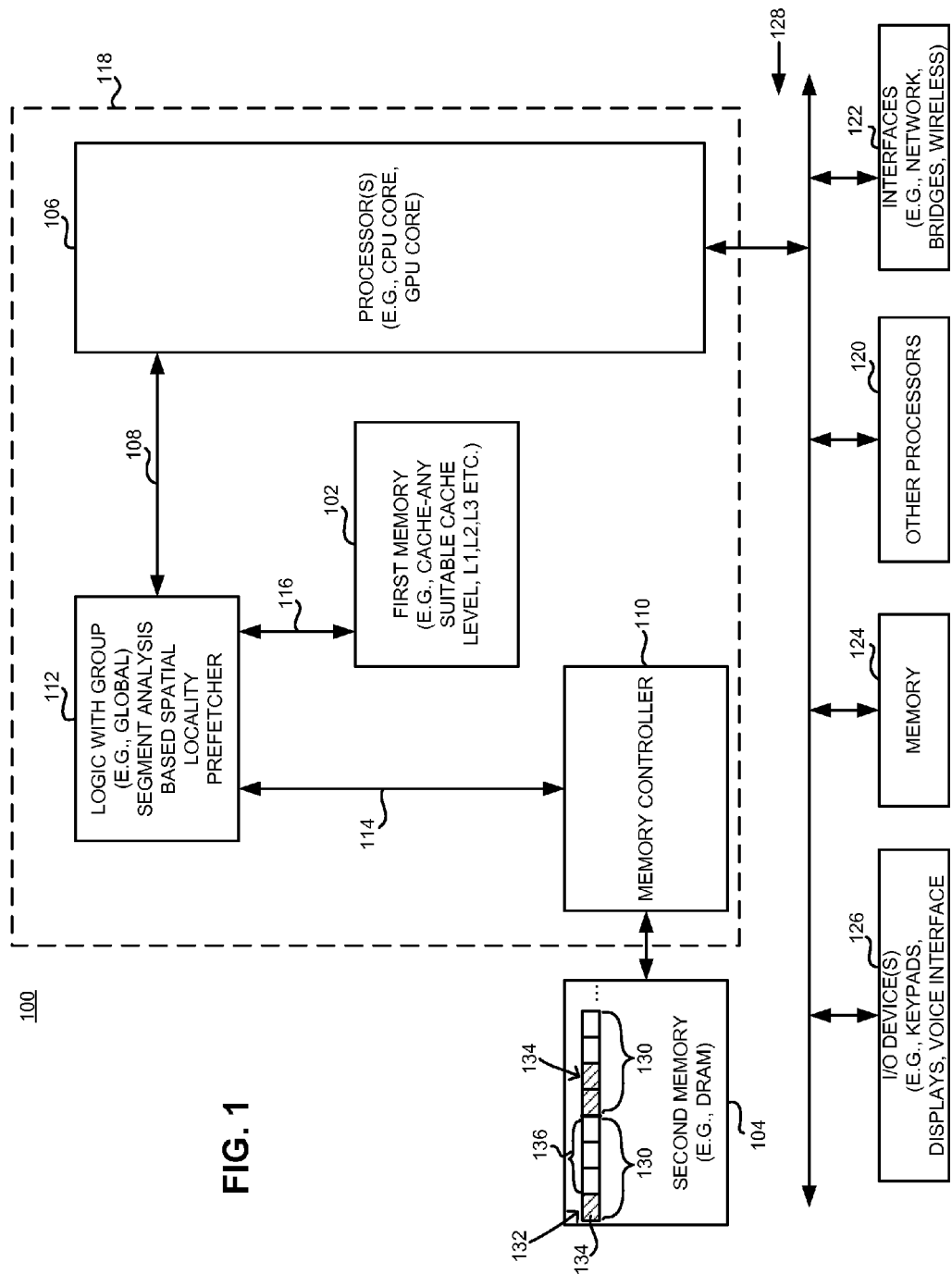
FIG. 1 is a block diagram illustrating one example of an apparatus in accordance with some embodiments.

Briefly, in one example, a type of conditional probability prefetcher prefetches data from memory by maintaining information relating to memory elements in a group of memory elements fetched from the second memory into the first memory. The information may be the aggregate number of memory elements that have been fetched for different memory segments in the group. The information is maintained responsive to fetching one or more memory elements from a segment of memory elements in the group of memory elements. Prefetching one or more remaining memory elements in the segment of memory elements from the second memory into the first memory occurs when the information relating to the memory elements in the group of memory elements indicates that a prefetching condition has been satisfied.

In one example, determining that the prefetch condition has been satisfied is based on a probability threshold. A probability is determined such that responsive to fetching one of more memory elements from the plurality of memory elements, a probability of future fetch requests is determined for one or more of the remaining memory elements from the plurality of memory elements. Prefetching one or more remaining memory elements in the segment of memory elements is based on determining the probability of future fetch requests. Also, in one example, maintaining information relating to memory elements in a group of memory elements includes tracking a plurality of fetched memory elements among a plurality of memory segments in the group.

In one example, the information is maintained by tracking fetched memory elements in one or more memory segments in memory. In response to fetching one or more memory elements, a probability of future fetch requests is determined. Prefetching additional memory elements is based on the determined probability. In another example, the prefetcher tracks fetched memory elements in one or more of a plurality of aligned and uniformly sized memory segments in the memory. The memory segments are treated as part of a group of aligned and uniformly sized memory segments. In one example, a determination is made as to whether to prefetch one or more remaining memory elements in a current memory segment based on the tracking of the fetched memory elements in one or more of the memory segments in a group of memory segments.

In one example, the logic and methods make use of, overall workload statistics to determine the spatial locality of the data in the group of memory segments and prefetches memory elements for a memory request after a certain probability threshold is met or exceeded. By way of example, a prefetcher calculates the probability (e.g., wherein calculations may be actual probabilities or estimates) that a certain number of cache lines will be used in a first memory segment based on a continuous tracking of how many memory segments in the group of memory segments have a same number of already fetched memory elements on a per memory segment basis. When a probability condition is satisfied such as upon meeting or exceeding a probability threshold, the prefetcher is triggered to fetch one or more of the remainder of the memory elements, such as remaining cache lines, in the first memory segment. A successful prefetch helps reduce memory latency and increase system performance. Also, as used herein prefetching can include simply issuing a prefetch request to a fetcher or also performing prefetching of data to cache memory.

In one example, a method and apparatus tracks fetched memory elements in a plurality of aligned uniformly sized memory segments (a group of memory segments) by monitoring memory-segment spatial locality level data, that may be for example stored as counter values, representing different levels of spatial locality for the group of memory segments. Each of the differing levels is based on spatial locality information for one or more of a plurality of memory segments in the group of memory segments.

In another example, the method and apparatus prefetches data by determining a probability that a prefetch condition should be carried out for a current cache request based on the estimated memory segment spatial locality level data. One or more of the remainder of memory elements from the current memory segment are prefetched based on the determined probability. The probability threshold may also be programmably set. When utilizing a probability threshold, prefetching data from the current memory segment based on the determined probability includes comparing a prefetch probability threshold to an estimated probability and prefetching data when the determined probability is equal to or beyond (such as greater than or less than depending upon the probability perspective used) the prefetch probability threshold.

In another example, the method and apparatus dynamically varies the prefetch probability threshold, such as by programming one or more registers at different times including, but not limited to, at manufacture time; at boot time (for example, by the BIOS); when deemed useful by the operating system, hypervisor, middleware, and the like; and/or by an application, program or other software.

In another example, the method and apparatus use different probability calculations for different regions of memory from which data is prefetched. For example different memory regions may belong to different applications executing on different processing cores.

In one example, generating the memory segment spatial locality level data includes updating at least one level counter for one or more of a plurality of segment spatial locality levels. This is done in response to changes in a number of fetched memory elements in any memory segment in the group of memory segments. In one example, the apparatus and method updates a segment-based cache residency map, henceforth referred to as a cache residency map, in response to fetches from the memory to cache and evictions of memory elements from the cache, indicating per memory segment cache line utilization. Generating the memory segment spatial locality data includes updating a plurality of level counters by using a corresponding increment and decrement operation based on changes in the cache residency map.

In another example, the method and apparatus varies a segment size of the aligned and uniformly sized memory segments and may also vary a level range of the memory segment spatial locality levels in response to a change in the memory segment size. For example, larger segment sizes result in more level counters.

Among other advantages, an ongoing (dynamic) determination of prefetch probability is used so that when larger caches are employed such as die stacked memory caches or other large caches, the disclosed prefetching techniques can be more aggressive than known prefetching techniques. For executing programs with suitable spatial locality characteristics, more aggressive techniques can result in improved performance. Other advantages will be recognized by those of ordinary skill in the art.

FIG. 1 illustrates one example of an apparatus 100 that utilizes a hierarchical cache architecture that provides prefetching of data for a first memory 102, such as cache memory, from a second memory 104 such as dynamic random access memory (e.g., DRAM as main memory) or other suitable memory. In this example, the apparatus includes one or more processors 106, such as one or more accelerated processing units (APU's), central processing units (CPU cores), graphics processing units (GPU cores) or any other suitable processor or structure that provides memory requests. The memory requests may be made for retrieval of data which can include either instructions or data, from the first memory 102. This can be done over bus 108 or using any suitable communication mechanism. It will be understood that the apparatus 100 is merely an example and will be used for purposes of illustration and that any suitable structure may be employed. In this particular example, the apparatus also includes a memory controller 110 that provides access to the second memory 104. The logic 112 may send a memory request to the second memory 104 through the memory controller 110 via bus 114 and may also be in communication with the first memory 102 through a bus 116. It is also recognized however that any suitable communication link architecture may be employed as desired.

The apparatus 100 also includes logic 112 such as one or more state machines, suitably programmed processor(s), field programmable gate arrays, DSP's, discrete logic or any suitable combination thereof or other suitable logic that is operative to, in this example, track fetched memory elements in a plurality of aligned and uniformly sized memory segments in the second memory 104. In this example, the logic 112 is also operative to prefetch one or more of the remainder of memory elements in a current aligned and uniformly sized memory segment from the second memory 104 based on the tracking of the fetched memory elements in one or more of a plurality of memory segments in a group of memory segments. The logic 112 operates as a type of segment-based spatial locality prefetcher.

In this embodiment, the processor 106, logic 112, first memory 102 and memory controller 110 are in an integrated circuit 118, however any suitable arrangement may be employed. The integrated circuit 118 may be in communication with other processors 120, interfaces 122, memory 124, and input/output (I/O) devices 126 as known in the art, through any suitable bus structure 128 or link(s). The processor 106, as known in the art may be executing workloads provided through the execution of applications, operating systems or any other suitable executable software code.

In one example, the second memory 104 is referred to as main memory and may include, for example, volatile memory (RAM) that has a slower access time than first memory 102 which may be, for example, cache memory. While the present disclosure discusses two classes of memory, 102 and 104, it should be appreciated that the concepts described herein are envisioned to be used with any number of memory classes. To operate more efficiently, when data is needed, logic 112, in response to a memory request from processor 106, looks to memory 102. The logic 112 will obtain data from the first memory 102 when there is a cache hit and provides the data for the processor 106. However, when a cache miss occurs, the logic 112 looks to the second memory 104 to determine if the data is stored in the second memory. In this example, data (which includes instructions and/or data) is transferred between, for example, the second memory 104 (such as main memory) and the first memory 102 (such as cache memory) in portions of a fixed size referred to as memory elements which in this example are also referred to as cache lines. Each cache line is illustratively 64 bytes long, but can be any suitable length. When a cache line or memory element is copied from the second memory 104 to the first memory 102, an entry is created in a cache residency map (see FIG. 3). The logic 112 performs a group based memory segment analysis and prefetches one or more cache lines based on the analysis as further set forth below.

In this example, the logic 112 serves as a type of prefetcher that employs aligned and uniformly sized memory segments 130, here each shown by way of example, having four memory elements 132. Accordingly, in this example, the memory segments 130 are aligned with an alignment of N bytes with respect to each other meaning that the address of a first memory element in each segment, when divided by N, gives the same remainder (e.g., 0) and each memory request is the same size. A plurality of the memory segments 130 are treated as a group of aligned and uniformly sized memory segments.

Figure 2:
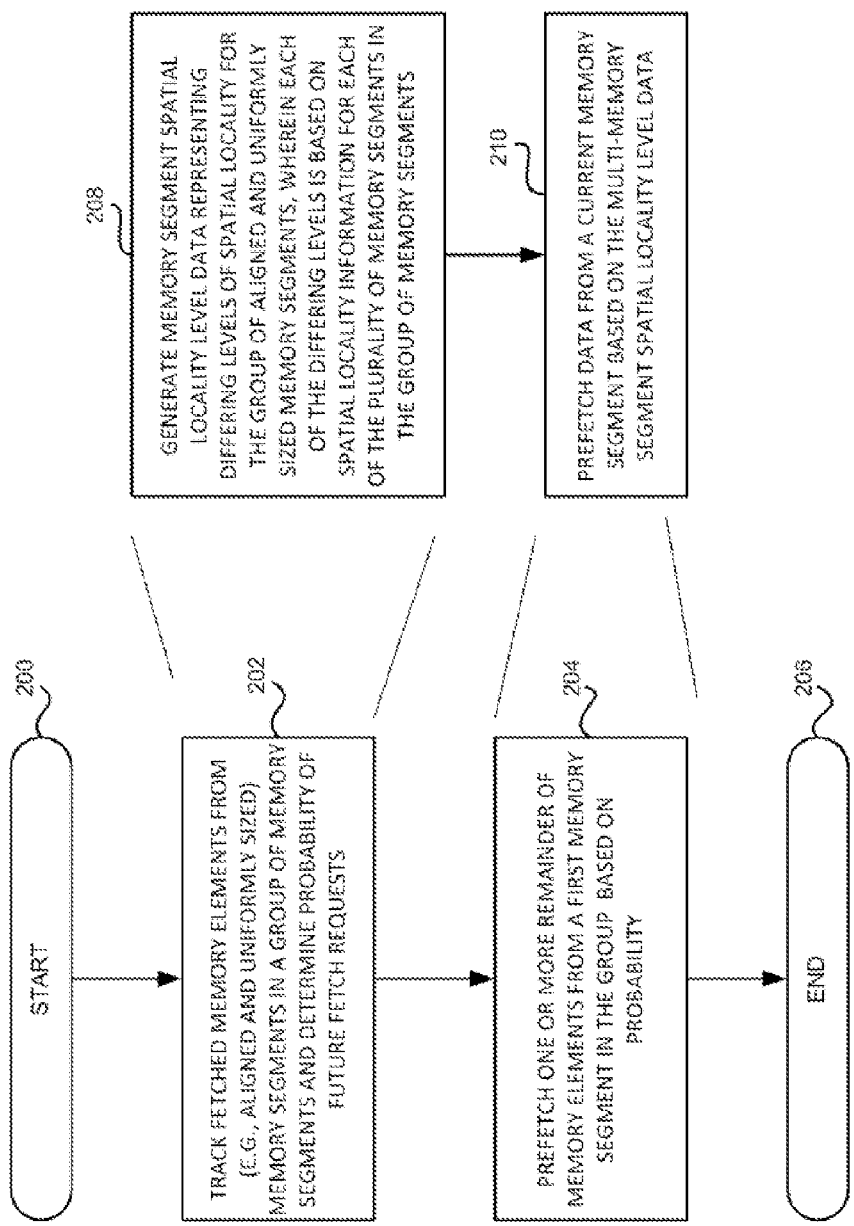
FIG. 2 is a flowchart illustrating one example of a method for prefetching data in accordance with some embodiments.

Referring also to FIG. 2, a method for prefetching data for the first memory 102 from the second memory 104 is illustrated. The process may be carried out in any suitable order and by any suitable structure, but in this example will be described as carried out electronically by the logic 112. The method may start as shown in block 200 by initializing any suitable circuitry including counters, registers or any other suitable structure as further set forth below. The method includes maintaining information relating to memory elements in a group of memory elements fetched from the second memory into the first memory. Responsive to fetching one or more memory elements from a segment of memory elements in the group of memory elements, the method includes prefetching one or more remaining memory elements in the segment of memory elements from the second memory into the first memory when the information relating to the memory elements in the group of memory elements indicates that a prefetching condition has been satisfied.

As shown in block 202, to generate the information relating to the memory elements in the group, the method may include tracking fetched memory elements 134 in one or more of a plurality of memory segments 130 in the second memory 104. In this example, tracking is accomplished using a set of counters (e.g., counters 300 in FIG. 3), however any suitable mechanism may be employed. The method may also include determining a probability of future fetch requests for one or more remaining memory elements, in response to fetching one or more memory elements. As shown in block 204, the method may include prefetching one or more of the remainder of memory elements 136 based on the determined probability. In one example the memory elements may be aligned and uniformly sized memory segment 130. Prefetching may be based on the tracking of fetched memory elements in one or more of the plurality of memory segments 130 in the group. The method may end as shown in block 206 for other memory requests as needed.

Figure 3:
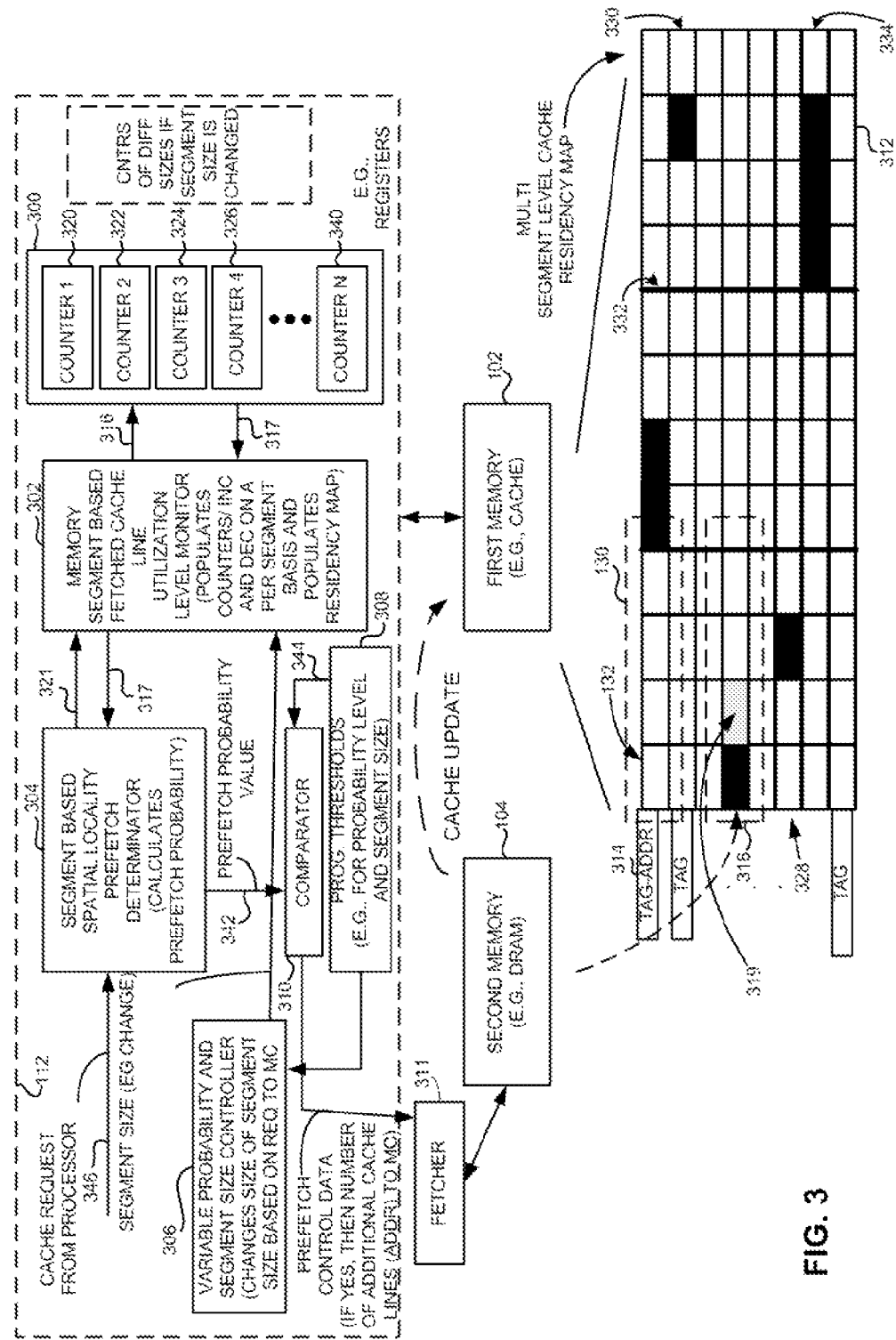
FIG. 3 is a block diagram illustrating one example of an apparatus for prefetching data in accordance with some embodiments.

Referring also to FIG. 3, the logic 112 may include memory segment spatial locality level counters 300, a memory segment based fetched cache line utilization level monitor 302, a memory segment based spatial locality prefetch estimator 304, variable probability and segment size controller 306, memory 308 such as a register, static random access memory (SRAM), or other suitable memory that stores programmable thresholds, a comparator 310 and fetcher 311. The memory segment spatial locality level counters 300 may be any suitable memory element including but not limited to, registers, SRAM, and the like. As shown, the memory segment based fetched cache line utilization level monitor 302 also maintains a cache residency map 312 in the first memory 102, a separate SRAM array, or in any other suitable location.

While the second memory 104 has many memory elements 132 or cache lines, the cache residency map 312 is shown to track ninety-six cache lines. This is only for purposes of illustration. Each aligned and uniformly sized memory segment 130 is again shown to include four memory elements or cache lines in this example, and therefore in this example, the cache residency map 312 tracks twenty-four segments. Each memory segment also includes a corresponding tag 314 such as an address of the memory segment. The cache residency map 312 may include, for example, a bit for each memory element. The bit when set indicates that the respective memory element or cache line is currently present in the first memory 102. For illustration purposes, the black memory elements are indicated as having already been fetched from the second memory 104 and present in the first memory 102. As also shown, the group of aligned and uniformly sized memory segments in this example includes twenty-four memory segments. However, it will be recognized that any suitable memory segment size and group size may be employed. For example, other size groupings that are a power of two are envisioned. Also, while the example focuses on prefetching between a cache and main memory, for example, the operations can be applied to placing data into the main memory from a hard drive or other data source. In such instances, resident cache lines, data units equal to a minimum read size (such as a page size) or different size may be used to track fetched data utilization. However any suitable number and types of memory classes may be employed. The cache residency map 312 is updated in response to fetches of memory elements from the second memory 104 to the first memory 102 and evictions of memory elements from the first memory 102. The level counters 300 are updated based on changes to the cache residency map 312 as further set forth below.

The memory segment based fetched cache line utilization level monitor 302 tracks memory segment spatial locality level data 316 (e.g., information) which is stored as counter values in counters 300 as shown in block 208 (FIG. 2). The memory segment spatial locality level data 316 represents different levels of spatial locality for a group of memory segments in the second memory 104. In this example, a separate counter is used for each utilization level. Each of the differing levels is based on spatial locality information for one or more of the plurality of memory segments in a group of memory segments. The logic 112 prefetches data from a current memory segment 318 based on the memory segment spatial locality level data 316 as shown in block 210 (FIG. 2) and as further described below. The data that is prefetched from the memory segments, in one example, are the remaining memory elements from the current memory segment that are not already present in the first memory 102.

The level counters 300 track the spatial locality levels or cache line utilization levels of memory segments indicating how many memory segments have a same number of fetched cache lines in the first memory 102. In this example, counter 320 (Counter 1) is used to indicate the number of memory segments 130 that have one memory element already cached in first memory 102, counter 322 (Counter 2) is used to track the number of memory segments that have two memory elements of a memory segment already cached, counter 324 (Counter 3) tracks the number of memory segments in the group that have three memory elements already cached and counter 326 (Counter 4), in this example, tracks the number of memory segments that have four (or all) of the cache lines already cached in the first memory 102. In the cache residency map 312, the "white" memory elements or cache lines represent that the corresponding memory elements are not currently loaded into the first memory 102.

By way of further example, since memory segments 318, 328 and 330 each have a single memory element already cached in the first memory 102, these memory segments are tracked in counter 320. Similarly, memory segment 332 having two memory elements already cached is tracked by counter 322 and memory segment 334 is tracked by counter 324 since it has three memory elements of its segment already cached in memory.

Hence Counter 1 is a running count of how many memory segments exist having exactly one of its respective constituent cache lines loaded into the first memory 102. (If this was applied to the segments shown in FIG. 3, Counter 1 would be set at "3"). Counter 2 is a running count of how many memory segments exist having exactly two of its constituent cache lines loaded into the first memory 102. (If this was applied to the cache lines shown in FIG. 3, counter 2 would be set at "1"). Counter 3 is a running count of how many memory segments exist having exactly three of its constituent cache lines loaded into the first memory 102. (If this was applied to the segments shown in FIG. 3, counter 3 would be set at "1"). Counter 4 is a running count of how many memory segments exist having exactly four of its constituent cache lines loaded into the first memory 102. (If this was applied to the segments shown in FIG. 3, counter 4 would be set at "0").

The counters 300 are continually updated based on the bits set in the residency map 312 (e.g. bitmap) as data is fetched and prefetched from the second memory 104 and evicted from the first memory 102 to keep a running track of the differing levels of spatial locality in the group of memory segments on a per segment basis such that one or more memory segments are tracked. Additional counters 340 can be employed depending upon the size of the memory segment. For example, if the memory segment is increased to include five memory elements, then an additional counter would be employed. As shown, for memory segments having four cache lines, four counters 320, 322, 324, and 326 are needed. Similarly, for segments having N cache lines, N counters are needed.

Using the counters 300, a running total of the collective states of segments is recorded. When cache line 319 (see FIG. 4-3) is loaded into the first memory 102, the memory segment 318 containing cache line 319 converts from a segment in which one cache line is loaded into the first memory 102 to a segment where exactly two cache lines are loaded into cache 102. Accordingly, Counter 1 is decremented and Counter 2 is incremented. As previously noted, often when one cache line is loaded into cache 102, another cache line is removed from the cache. Such removal also results in appropriate changes in counters 300 and the cache residency map 312.

While the above description discusses counters 300 for the second memory 104 as a whole, it should be appreciated that embodiments are envisioned where counters are provided for a subset of the second memory 104. Indeed, multiple sets of counters can be provided for multiple subsets of the second memory 104, respectively. Such subsets are envisioned to include but are not limited to instruction vs. data subsets, stack vs. heap subsets, private vs. shared subsets, subsets based on which processor core is accessing the data, subsets for different threads, and subsets for CPU vs. GPU usage.

Updating the cache residency map 312 is performed in response to fetches of memory elements in memory segments from the second memory 104 to the first memory 102, and also in response to the eviction of memory elements from the first memory 102. The cache residency map 312 indicates per-memory segment cache line utilizations. The level counters 300 are updated using a corresponding increment and decrement operation based on changes in the cache residency map 312 as fetches, prefetches, and evictions are performed for memory elements from the memory segments in the group of memory segments.

In one example, prefetching one or more of the remainder of memory elements in a current aligned and uniformly sized memory segment is done by determining a probability that a prefetch operation should be carried out for a current cache request based on the memory segment spatial locality level data 316 that is stored in the counters 300 by the memory segment based fetched cache line utilization level monitor 302. This data is retrieved from the counters 300 as shown by line 317 and passed to the segment based spatial locality prefetch determinator 304 that calculates a probability that a prefetch operation should be carried out for a current cache request. In this example, prefetching of one or more of the remainder of memory elements from the current memory segment is based on the determined probability. It will be recognized that the memory segment spatial locality level data 316 may be obtained in any suitable manner such as directly from memory or may be provided by another process or source as desired. The segment based spatial locality prefetch determinator 304 sends a request 321 to the memory segment fetched cache line utilization level monitor 302 to obtain the memory segment spatial locality level data 316 when the probability is to be calculated.

The segment based spatial locality prefetch determinator 304 calculates a prefetch probability value 342, in this example referenced as P(S|N). In one example, the determination of the probability that a prefetch operation should be carried out is based on the following formula:

$$P(S|N)=P(S)/\Sigma_{i=N}^{S}P(i) \qquad (EQ. 1)$$

wherein P(S|N) is the probability that if N cache lines in a memory segment are already cached in the first memory 102, that all of the remaining cache lines in the memory segment will also be called for storage in the first memory 102; S is the memory segment size; N is a number of cache lines in a memory segment that are already cached in the first memory 102; P(i) is the memory segment spatial locality level data for a given level "i" (e.g., counter i from the counters 300) and is the number of memory segments in the group that have exactly "i" cache lines already cached in the first memory 102; and P(S) is the highest memory segment spatial locality level of the memory segment spatial locality level data and is how many memory segments currently have all their cache lines stored in the first memory 102.

In operation, in one example, a request is generated by the processor 106 for one cache line to be loaded from the second memory 104 to the first memory 102. The logic 112 then attempts to determine the probability that an additional cache line or cache lines within the memory segment corresponding to the requested cache line will be called. It should be appreciated that the term "probability" includes any statistical formulation that provides insight into the likelihood of an event occurring rather than being restricted to a true statistical probability.

In one example, using equation 1, the probability of needing all four cache lines within a memory segment where two of the cache lines are already in the cache is estimated as:

$$P(4/2)=\text{Counter 4}/(\text{Counter 2}+\text{Counter 3}+\text{Counter 4})$$

For purposes of example, assume P(1) "Counter 1" is 1337, Counter 2 is 31415, Counter 3 is 27183, and Counter 4 is 525600. Then, for a four-cache line segment 318, with two cache lines in the cache, the probability that an additional cache line from the segment will be called by processor 106 is 525600/(31415+27183+525600)=89.9%.

The resultant probability is then compared to a threshold. When the probability that an additional cache line from the memory segment will be called by the processor is below or equal to a defined threshold (i.e. 10%, 50%, 90%, etc.), only the requested cache line is placed in the cache. When the probability that an additional cache line from the memory segment will be called by processor is above (or equal to if desired) to the defined threshold, one or more and potentially all of the remaining cache lines in the segment are prefetched. Thus, in the above example, if the threshold is less than 89.9%, then upon a second cache line of a segment being called, in addition to fetching the called or current cache line, one or more of the remaining unfetched cache lines within the memory segment are also pulled into the cache. The determination that all or a subset of the remaining unfetched cache lines within the current memory segment are to be pulled into the cache can be based on a variety of criteria, for example, but not limited to, the available bandwidth to/from the second memory 104, the available bandwidth to/from the first memory 102, the number of invalid entries in the first memory 102, and the like. In some embodiments, a plurality of thresholds may be employed in the determination of the prefetching of the one or more remaining unfetched cache lines within the current memory segment. For purposes of example, if a first threshold is 75% and a second threshold is 90%, a prefetcher may prefetch one additional cache line from the remainder of the unfetched cache lines from the current memory segment if the estimated probability is greater than or equal to the first threshold but less than the second threshold, and the prefetcher may prefetch all remaining unfetched cache lines from the current memory segment if the estimated probability is greater than or equal to the second threshold. For example, using the previous example estimated of 89.9%, only one additional cache line from the two remaining unfetched cache lines would be prefetched.

It should be appreciated that the above prefetching system and method is one where "training" is utilized. As a program or data set progresses, the content of the cache matures and provides increasingly accurate indications of data usage. Furthermore, activation of the prefetching can result in an increased number of memory segments in which all remaining cache lines are loaded into cache. Accordingly, embodiments are contemplated where differing equations or differing threshold values are utilized at differing points of maturity, utilization, or some other characteristic of the cache.

The above prefetching method utilizes a trait of data storage that provides that data stored in the same spatial locality in the second memory 104 is often related and as such calling one piece of data provides information regarding the likelihood of needing other data that is spatially located proximate to the already called data. As previously noted, memory segments having any number of cache lines therein can be used.

Embodiments are further contemplated where the probability of calling additional cache lines is approximated rather than being explicitly computed from the above equation or other similar equation. Similarly, as noted above embodiments are contemplated where less than all of the balance of the cache lines in a memory segment are called.

As previously noted, embodiments are contemplated where a set of counters are dedicated to a subset of memory. One such instance is when a subset of the second memory 104 is used for a specific thread or program. Upon ending that thread or program and starting a new one, the existing counter values are no longer relevant to the data now being requested. Accordingly, upon execution of a new operation, counters are reset to begin new counting for the new operation.

The comparator 310 compares the prefetch probability value 342 to a programmed threshold 344 that is programmed, for example in register 308. If the prefetch probability value 342 is equal to or beyond (e.g., above) the threshold value 344, prefetch control data (e.g., addresses and number of additional cache lines to fetch) is provided that causes the fetcher 311 to prefetch the one or more of the remainder of the cache lines in the current memory element. If not, then no prefetch operation is performed. The fetcher 311 may be part of the logic 112 if desired.

As noted above, each memory segment is sized to store a same number of cache lines or memory elements. Generating the memory segment spatial locality level data 316 includes updating a level counter for an associated memory segment spatial locality level, such as each of the counters 320, 322, 324, and 326, in response to changes in memory element fetch status for any memory segment in the group of memory segments.

In addition, the segment size of the segments may be varied as well as varying the level of the range of memory segment spatial locality levels in response to changes in memory segment size. In addition, the programmable threshold 344 may be changed to change the operation of the prefetch mechanism if desired.

Figure 4:
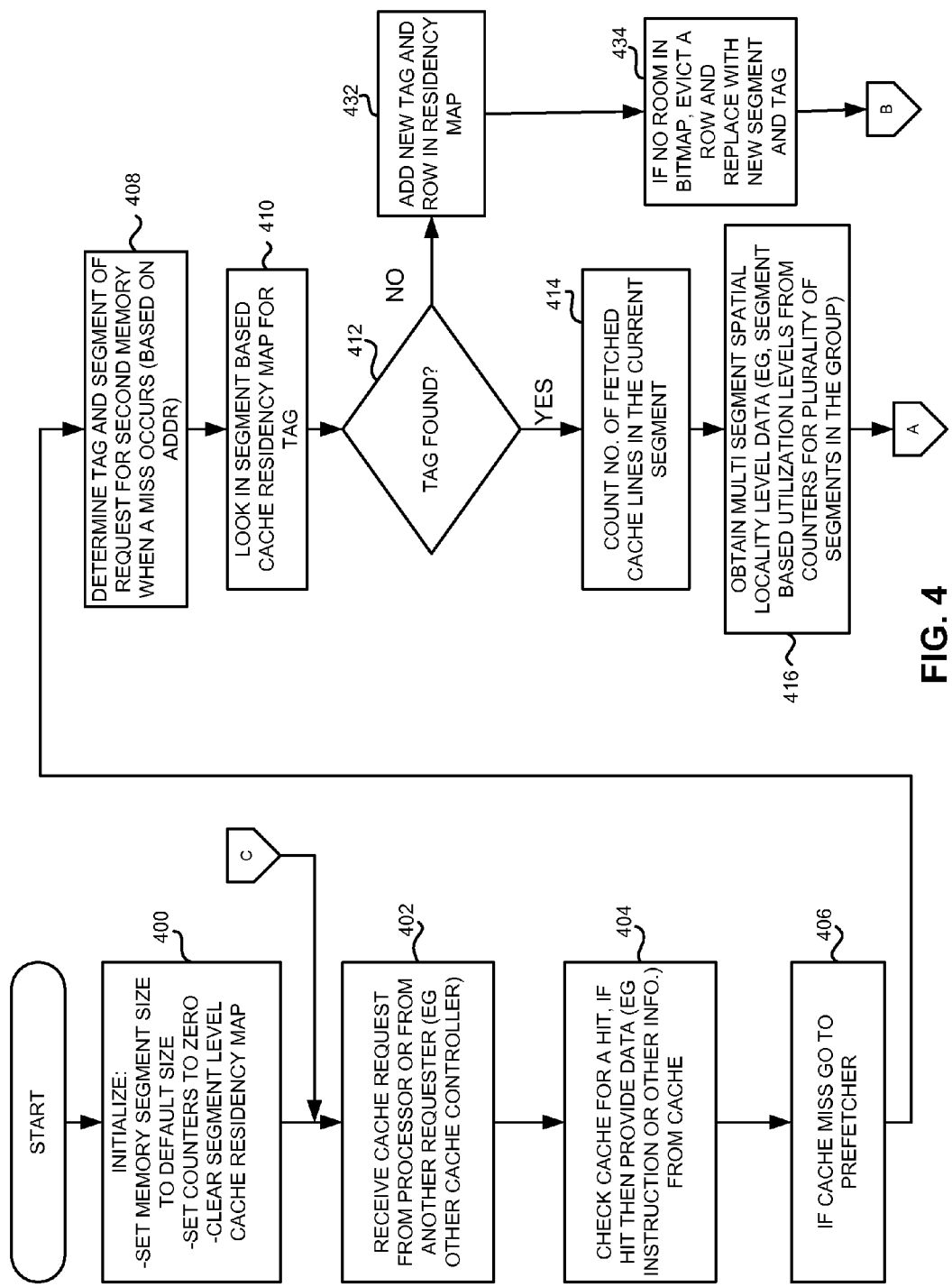
FIGS. 4 and 5 is a flowchart illustrating one example of a method for prefetching data in accordance with some embodiments.
Figure 5:
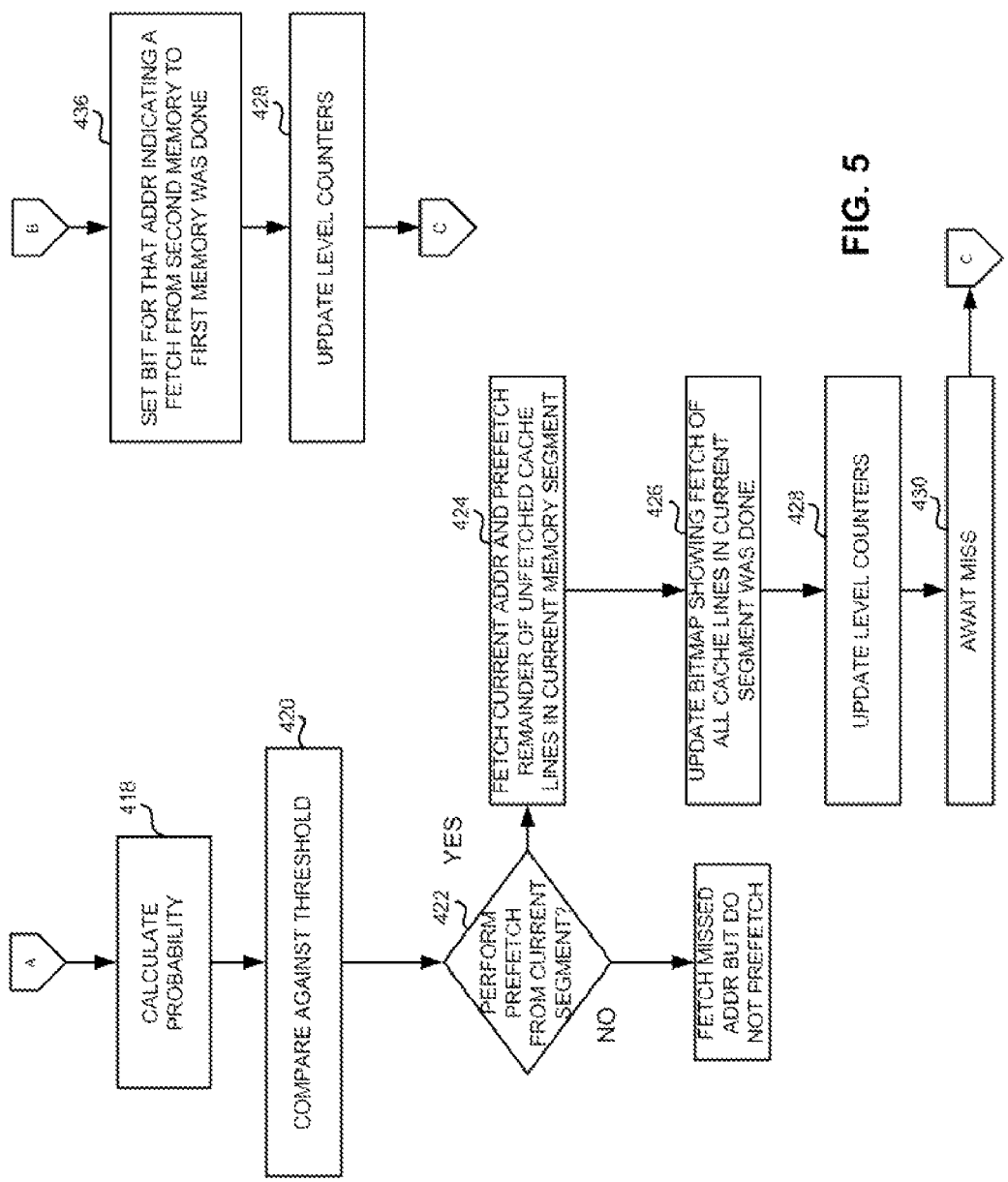

Referring to FIG. 4 and FIG. 5, in operation, the logic 112 may perform an initialization operation shown in block 400 by, for example, setting the memory segment size using variable probability and segment size controller 306 which may be, for example, control a register or set of registers that are programmable through a suitable user interface of any suitable kind as known in the art and in this example, the memory segment size is set to four memory elements. The counters 300 can be set to zero and the cache residency map 312 may be cleared if the first memory 102 is initially empty (i.e., contains no valid cache lines), or the cache residency map 312 may be initialized to accurately reflect the current contents of the first memory 102. Any other suitable initialization operations may be employed. In block 402, the method includes receiving a cache request 346, such as from processor 106, or from any other suitable requestor such as another cache controller or any other suitable request engine. As shown in block 404, the method includes checking the first memory 102 for a cache hit. If a cache hit occurs then the logic 112 provides the requested data from the cache as known in the art using the fetcher 311. However, as shown in block 406, if a cache miss occurs, then the logic 112 employs the prefetching check. The tag 314 from the memory request is determined. This is shown in block 408. As shown in block 410, the method includes checking the cache residency map 312 for the corresponding tag 314. As shown in block 412, if the tag is found as shown in block 414, the method includes counting the number of cache lines from the current segment currently resident in the first memory 102. In this example, current segment 318 has one cache line already fetched. As shown in block 416, the method includes obtaining spatial locality level data 317 from each of the counters 320, 322, 324, and 326. As shown in block 418 (FIG. 5), the spatial locality prefetch determinator 304 then calculates the prefetch probability value 342. The prefetch probability value 342 is then compared to the probability threshold 344 as shown in block 420. If the prefetch probability value 342 is above the threshold 344 as shown in block 422, and block 424, the logic 112 fetches the current address and prefetches one or more of the remainder of the unfetched cache lines in the current memory segment. As shown there are two remaining white boxes in memory segment 318. The gray box in 319 is a current fetched cache line that is being requested.

As shown in block 426, the method includes updating the cache residency map 312 to indicate that the remainder of the current segments have been fetched. As shown in block 428, the requisite level counter 320, 322, 324, and 326 is incremented or decremented to keep a current count of how many memory segments have either one, two, three, or four memory elements already fetched. The method continues by waiting for another cache miss as shown in block 430.

Returning to block 412, if no tag has been found in the cache residency map 312, a new tag and row is added to the residency map as shown in block 432. If there is no room left in the residency map, a row is evicted and replaced with a new tag and segment as shown in block 434. A bit is for each memory element indicating the corresponding memory element from the second memory 104 is currently present in the first memory 102 as shown in block 436. As shown in block 428 the level counters 320, 322, 324, and 326 are updated as needed based on the updated bit settings in the cache residency map 312.

The disclosed integrated circuit designs may be employed in any suitable apparatus including but not limited to, for example, servers, printers, high definition televisions, handheld devices such as smart phones, portable devices such as tablets, laptops or any other suitable device. Also suitable operations set forth above may be carried out my one or more suitable processors that are in communication with non-transitory computer readable medium such as but not limited to CDROM, RAM, other forms of ROM, hard drives, distributed memory, etc. The non-transitory computer readable medium stores executable instructions that when executed by the one or more processors cause the one or more processors to perform, for example, the operations of the logic 112 as described with reference to FIG. 2 and FIGS. 4-5.

Also, integrated circuit design systems (e.g., work stations including, as known in the art, one or more processors, associated memory in communication via one or more buses or other suitable interconnect and other known peripherals) are known that create wafers with integrated circuits based on executable instructions stored on a non-transitory computer readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic and circuits described herein may also be produced as integrated circuits by such systems using the computer readable medium with instructions stored therein. For example, an integrated circuit with the aforedescribed logic and structure may be created using such integrated circuit fabrication systems. In such a system, the computer readable medium stores instructions executable by one or more integrated circuit design systems that causes the one or more integrated circuit design systems to produce an integrated circuit that includes logic operative to track fetched memory elements in one or more of a plurality of memory segments in the second memory wherein the memory segments may be aligned and uniformly sized memory segments of a group of aligned and uniformly sized memory segments, and prefetch one or more of a remainder of memory elements in a current aligned and uniformly sized memory segment based on the tracking of the fetched memory elements in one or more of the plurality of memory segments in the group as well as the other operations set forth above as desired.

As described above, the conditional probability prefetcher logic in one example, uses statistical information gathered over, for example, the run of the workload to determine the spatial locality of previously fetched memory elements. Using this global data, the logic can decide when prefetching should be performed. In some embodiments, the prefetcher logic can use simple counters rather than large tables used in most prior prefetching schemes. The logic can be used at high levels of cache and a variable of the probability threshold allows for the use at any level of memory hierarchy. The above method and device allows large caches (such as die-stacked caches) to increase their aggressiveness (err on the side of caching). These large caches are more likely to have available space that can accommodate the additional prefetched data. Large caches are furthermore less likely to have the prefetched data push other useful data out of the cache. However, the present disclosure has applicability to caches of many types, including, but not limited to cache of different sizes, caches at different levels of the cache hierarchy (e.g., level-one cache, level-two cache, level-three cache), caches used by different computing units (e.g., a processor cache, a GPU cache), and the like. Other advantages will be recognized by those of ordinary skill in the art.

The above detailed description of the embodiments and the examples described therein have been presented for the purposes of illustration and description only and not by limitation. It is therefore contemplated that the embodiments cover any and all modifications, variations or equivalents that fall within the spirit and scope of the basic underlying principles disclosed above and claimed herein.

What is claimed is:
1. A method for prefetching data for a cache memory from a main memory comprising:
maintaining information relating to a plurality of memory segments, each including one or more memory elements that are fetched from the main memory into the cache memory by tracking how many of the plurality of memory segments have a same number of fetched memory elements in the cache memory; and
responsive to fetching the one or more memory elements from one of the plurality of memory segments, prefetching one or more remaining memory elements included in the one of the plurality of memory segments from the main memory into the cache memory when the information relating to the memory elements indicates that a prefetching condition has been satisfied.

2. The method of claim 1 comprising determining that the prefetching condition has been satisfied based on a probability threshold.

3. The method of claim 1 wherein maintaining information relating to the one or more memory elements comprises tracking a plurality of fetched memory elements among the plurality of memory segments.

4. The method of claim 1 comprising, responsive to fetching the one of more memory elements from the one of the plurality of memory segments, determining a probability of future fetch requests for one or more of the remaining memory elements included in the one of the plurality of memory segments; and prefetching the one or more remaining memory elements included in the one of the plurality of memory segments based on determining the probability of future fetch requests.

5. The method of claim 3 wherein tracking the plurality of fetched memory elements comprises tracking fetched memory elements in one or more of a plurality of aligned uniformly sized memory segments.

6. The method of claim 5 wherein tracking the plurality of fetched memory elements comprises:
  generating memory segment spatial locality level data representing differing levels of spatial locality for the plurality of memory segments in the main memory, wherein each of the differing levels is based on spatial locality information for each of the plurality of memory segments; and
  wherein prefetching comprises prefetching one or more of the remainder of memory elements from the one of the plurality of memory segments in the main memory based on the memory segment spatial locality level data.

7. The method of claim 6 wherein:
  determining the probability is based on the memory segment spatial locality level data; and
  wherein prefetching comprises prefetching one or more of the remainder of memory elements from the one of the plurality of memory segments based on the determined probability.

8. The method of claim 7 wherein each memory segment size in the main memory comprises a same number of cache lines and wherein determining the probability that a prefetch operation should be carried out is based on the following formula:

$$P(S|N)=P(S)/\Sigma_{i=N}^{S} P(i)$$

wherein P(S|N) is the probability that, if N cache lines in a memory segment are already cached in the cache memory, the rest of the cache lines in the memory segment will be called for storage in the cache memory;
  S is the memory segment size;
  N is a number of cache lines in the memory segment that are already cached in the cache memory;
  P(i) is the memory segment spatial locality level data for a given level "i" and is the number of memory segments that have exactly "i" cache lines already cached in the cache memory; and
  P(S) is the highest memory segment spatial locality level of the memory segment spatial locality level data and is how many memory segments currently have all their cache lines stored in the cache memory.

9. The method of claim 7 wherein each memory segment is sized to store a same number of cache lines and wherein generating memory segment spatial locality level data comprises updating at least one level counter for an associated memory segment spatial locality level in response to changes in any memory segment in the plurality of memory segments.

10. The method of claim 9 comprising updating a segment-based cache residency map in response to fetches from the main memory to the cache memory indicating per memory segment cache line utilization and wherein generating memory segment spatial locality level data comprises updating a plurality of level counters by using a corresponding increment and decrement operation based on changes in the segment-based cache residency map.

11. The method of claim 7 wherein prefetching data from the current memory segment based on the determined probability comprises comparing a prefetch probability threshold to the determined probability and prefetching data when the determined probability is equal to or greater than the prefetch probability threshold.

12. The method of claim 11 comprising varying the prefetch probability threshold.

13. The method of claim 7 comprising using different probability calculations for different regions of main memory.

14. The method of claim 6 comprising varying a segment size of the memory segments and varying a level range of the memory segment spatial locality levels in response to a change in memory segment size.

15. An apparatus operative to prefetch data for a cache memory from a main memory comprising:
  logic operative to track a plurality of fetched memory elements in the main memory and responsive to fetching the memory elements from at least one of a plurality of memory segments that includes the memory elements, determine a probability of future fetch requests for one or more of the remaining memory elements from the at least one of the plurality of memory segments based on how many of the plurality of memory segments have a same number of fetched memory elements in the cache memory; and
  operative to prefetch the one or more of the remaining memory elements from the at least one of the plurality of memory segments based on the determining the probability of future fetch requests.

16. The apparatus of claim 15 wherein the logic is operative to track fetched memory elements in one or more of a plurality of aligned uniformly sized memory segments.

17. The apparatus of claim 16 wherein the logic is operative to:
  generate memory segment spatial locality level data representing differing levels of spatial locality for the plurality of memory segments in the main memory, wherein each of the differing levels is based on spatial locality information for each of the plurality of memory segments; and
  wherein the logic is operative to prefetch data from the one of the plurality of memory segments in the main memory based on the memory segment spatial locality level data.

18. The apparatus of claim 17 comprising:
  a processor, operatively coupled to the logic, operative to provide cache requests;
  the cache memory, operatively coupled to the processor and to the logic, the logic operative to determine the probability that a prefetch operation should be carried out for a cache request based on the memory segment spatial locality level data; and
  operative to prefetch data from the one of the plurality of memory segments segment based on the determined probability.

19. The apparatus of claim 18 wherein each memory segment size in the main memory comprises a same number of cache lines and wherein the logic is operative to determine the probability that a prefetch operation should be carried out is based on the following formula:

$$P(S|N)=P(S)/\Sigma^S_{i=N}P(i)$$

wherein P(S|N) is the probability that, if N cache lines in a memory segment are already cached in the cache memory, the rest of the cache lines in the memory segment will be called for storage in the cache memory;
S is the memory segment size;
N is a number of cache lines in the memory segment that are already cached in the cache memory;
P(i) is the memory segment spatial locality level data for a given level "i" and is the number of memory segments that have exactly "i" cache lines already cached in the cache memory; and
P(S) is the highest memory segment spatial locality level of the memory segment spatial locality level data and is how many memory segments currently have all their cache lines stored in the first cache memory.

20. The apparatus of claim 16 wherein each memory segment is sized to store a same number of cache lines and wherein the logic is operative to generate the memory segment spatial locality level data by updating at least one level counter for an associated memory segment spatial locality level in response to changes in any memory segment in the plurality of memory segments.

21. The apparatus of claim 20 comprising the main memory and wherein the logic is operative to update a segment-based cache residency map in response to fetches from the main memory to the cache memory indicating per memory segment cache line utilization and wherein generating memory segment spatial locality level data comprises updating a plurality of level counters by using a corresponding increment and decrement operation based on changes in the segment-based cache residency map.

22. The apparatus of claim 15 wherein the logic is operative to prefetch data from the current memory segment based on the determined probability by comparing a prefetch probability threshold to the determined probability and prefetching data from the main memory when the determined probability is equal to or greater than the prefetch probability threshold.

23. The apparatus of claim 22 comprising a programmable register operatively coupled to the logic that stores a probability threshold and wherein the logic is operative to vary the prefetch probability threshold.

24. The apparatus of claim 18 wherein the logic is operative to use different probability calculations for different regions of main memory.

25. The apparatus of claim 24 wherein the logic is operative to vary a segment size of the memory segments and vary a level range of the memory segment spatial locality levels in response to a change in memory segment size.

26. A non-transitory storage medium comprising executable instructions that when executed cause an integrated circuit design system to produce an integrated circuit that comprises:
logic operative to track fetched memory elements in each of a plurality of memory segments in a main memory wherein the memory segments are aligned and uniformly sized memory segments of a group of aligned and uniformly sized memory segments; and wherein the logic is operative to prefetch a remainder of memory elements in a current aligned and uniformly sized memory segment from the memory based on determining a probability of future fetch requests tracking of fetched memory elements in each of the plurality of memory segments in the group, wherein the probability is based on how many of the memory segments have a same number of fetched memory elements in a cache memory.

27. An apparatus operative for prefetching data for a cache memory from a main memory comprising:
logic operative to track fetched memory elements in each of a plurality of memory segments in the main memory by tracking how many of the plurality of memory segments have a same number of fetched memory elements in the cache memory, wherein the memory segments are aligned and uniformly sized memory segments of a group of aligned and uniformly sized memory segments; and
operative to prefetch a remainder of memory elements in a current aligned and uniformly sized memory segment based on the tracking of fetched memory elements in each of the plurality of memory segments in the group.

28. A method for prefetching data for a cache memory from a main memory comprising:
tracking fetched memory elements in each of a plurality of memory segments in the main memory by tracking how many of the plurality of memory segments have a same number of fetched memory elements in the cache memory, wherein the memory segments are aligned and uniformly sized memory segments of a group of aligned and uniformly sized memory segments; and
prefetching one or more of a remainder of memory elements in a current aligned and uniformly sized memory segment based on the tracking of the fetched memory elements in each of the plurality of memory segments in the group.

29. A non-transitory storage medium comprising executable instructions that when executed cause an integrated circuit design system to produce an integrated circuit that comprises:
logic operative to track a plurality of fetched memory elements in the main memory and responsive to fetching the memory elements from at least one of a plurality of memory segments that includes the memory elements, determine a probability of future fetch requests for one or more of the remaining memory elements from the at least one of the plurality of memory segments based on how many of the plurality of memory segments have a same number of fetched memory elements in the cache memory; and
to prefetch the one or more of the remaining memory elements from the at least one of the plurality of memory segments based on the determining the probability of future fetch requests.

30. An apparatus operative for prefetching data for a cache memory from a main memory comprising:
logic operative to maintain information relating to a plurality of memory segments, each including one or more memory elements that are fetched from the main memory into the cache memory by tracking how many of the plurality of memory segments have a same number of fetched memory elements in the cache memory; and
responsive to fetching the one or more memory elements from one of the plurality of memory segments, prefetching one or more remaining memory elements included in the one of the plurality of memory segments from the main memory into the cache memory when the information relating to the memory elements indicates that a prefetching condition has been satisfied.

* * * * *